A. CARNIE.
PROCESS OF CALCINING AND CLINKERING.
APPLICATION FILED MAR. 6, 1911.
1,158,371. Patented Oct. 26, 1915.
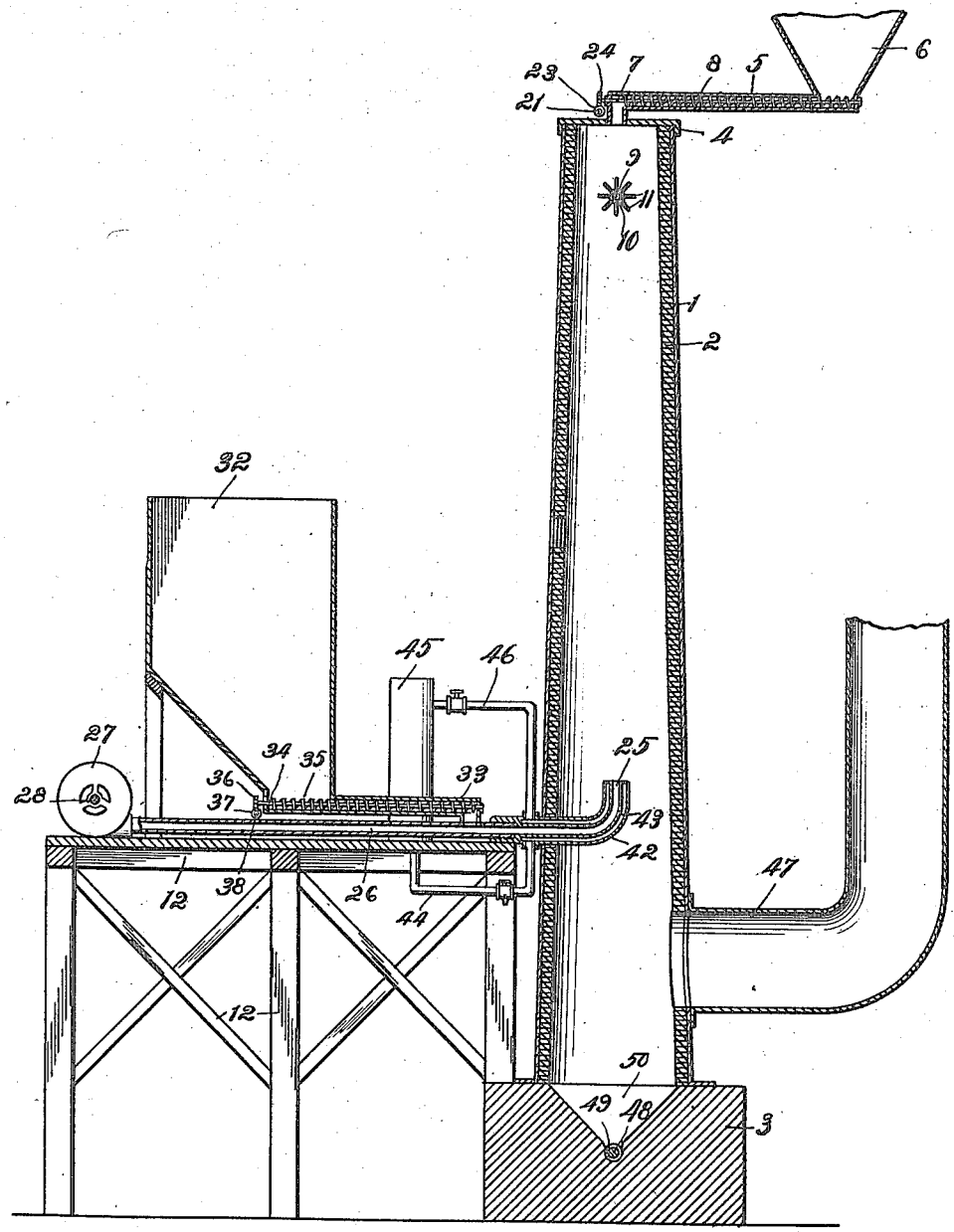
WITNESSES:
INVENTOR.
Alexander Carnie
BY
Warren D. House
His ATTORNEY.

UNITED STATES PATENT OFFICE.

ALEXANDER CARNIE, OF INDEPENDENCE, MISSOURI.

PROCESS OF CALCINING AND CLINKERING.

1,158,371.  Specification of Letters Patent.  Patented Oct. 26, 1915.

Application filed March 6, 1911. Serial No. 612,531.

*To all whom it may concern:*

Be it known that I, ALEXANDER CARNIE, a citizen of Great Britain, residing at Independence, in the county of Jackson and State of Missouri, have invented certain new and useful Improvements in Processes of Calcining and Clinkering, of which the following is a specification.

My invention relates to improvements in processes of calcining and clinkering.

The object of my invention is to provide a novel method or process of calcining and clinkering or fusing materials, by which the calcinated product will be in comminuted form so that it may be readily handled and ground.

My invention is particularly adapted for making hydraulic cement, such as Portland cement.

In an application filed by me Feb. 13, 1915, having Serial No. 7964, I have claimed the apparatus herein shown and described.

With my improved method, the cement forming materials in powdered form are mixed and are diffused in a fluid, such as gas or air, and while in the diffused condition are subjected to heat sufficient to calcinate and fuse or clinker them. By reason of the materials being calcinated while diffused in the fluid, the product resulting from the calcination is precipitated in small nodules of cement, instead of forming in large chunks, such as would be produced if the cement forming materials were calcined while not in a diffused condition.

While in the preferred form of my invention, the cement forming materials are, during calcination, diffused in a fluid, such as gas or air, I also contemplate the calcination and clinkering or fusing of the diffused cement forming materials in a vacuum.

In the preferred form of my invention raw non-calcined mixed powdered cement forming materials are permitted to fall and while falling are subjected to calcination and clinkering or fusing. Preferably, the calcination is effected by subjecting the falling cement forming materials to contact with a flame. The calcination and clinkering or fusing, however, may be effected by heating the materials sufficiently without direct contact with the flame. Preferably, to effect calcination and clinkering or fusing, a hot blast is projected upwardly against the falling cement forming materials, thus assisting in their diffusion during the period of calcination and also serving to retain the diffused materials suspended in the fluid for a longer period than would be the case if they were permitted to fall without hindrance.

In making ordinary hydraulic cement, powdered carbonate of calcium, such as lime stone, is mixed with powdered clay. These materials are then diffused and while in the state of diffusion are subjected to a temperature sufficient to calcinate and fuse or clinker them, say a temperature of about twenty eight hundred degrees Fahrenheit. The product resulting from the calcination and fusing is in the form of small cement nodules or clinkers, which may be readily handled and ground into commercial form.

In the accompanying drawing, I have illustrated in vertical section an apparatus by which my improved method of calcination and clinkering or fusing may be practised.

A vertical stack, having an outer casing 1, which envelops a fire brick lining 2, is supported on a base 3, and is provided at its upper end with a cap 4 having a vertical opening in which is fitted the downwardly turned end of a horizontal conductor 5, which is connected to the bottom of a hopper 6 in which are placed the materials which are to be calcined and clinkered or fused.

Lengthwise through the conductor 5 extends a rotary shaft 7, provided in said conductor with a feed screw 8 for forcing the cement forming materials from the hopper 6, through the conductor 5 and into the stack, which serves as a calcining and clinkering or fusing chamber.

Extending through the stack, below the cap 4, is a rotary shaft 9, on which is secured a horizontal drum 10, having radial blades 11, located so as to receive thereon the materials which are discharged from conductor 5. When the drum 10 is rotated the blades 11 diffuse the materials to be calcined. Any suitable means may be provided for rotating the shaft 9. A shaft 21 has mounted on and rotative with it a worm 23, which meshes with a worm wheel 24, secured to the shaft 7. When the shaft 21 is rotated the screw 8 will be rotated by means of the mechanism just described. Any suitable means may be provided for rotating the shaft 21.

For calcining the diffused powdered material, a burner 25 extends horizontally through the wall of the stack and has its discharge end extending upwardly in the stack below the drum 10. The other end of the burner 25 is connected to a horizontal conductor 26 connected to a blower 27, of any suitable type, and having a horizontal driving shaft 28, which may be rotated by any suitable means.

On a frame 12 is a bin 32, for containing fuel, such as coal slack. A horizontal conductor 33 is connected at one end to the lower part of the bin 32, the other end of the conductor being connected to the conductor 26. Through the conductor 33 and the bin 32 extends a horizontal rotary shaft 34, on which is mounted a feed screw 35, which also extends into the bin 32. When the shaft 34 is turned in the proper direction the fuel will be forced by the screw 35, from the bin 32, through conductor 33, and into the conductor 26, from which the fuel will be blown by an air blast from the blower 27, into and through the burner 25.

To rotate the shaft 34, it has secured to it a worm wheel 36, which meshes with a worm 37, secured to a rotary horizontal shaft 38, which may be rotated by any suitable means.

To protect the burner 25 from the heat, the burner 25 is preferably encircled by a casing 42. Between the casing 42 and the burner 25, is a space 43, which is supplied with water by a conductor 44, which extends through the casing 42 and is connected to the lower end of a tank 45, which is mounted on the frame 12, and contains water. Extending through the casing 42 and communicating with the space 43, is a conductor 46, connected to the tank 45, near the top thereof. By means of the tank 45 and conductors 44 and 46, the space 43 is kept supplied with water.

A smoke pipe 47 has its lower end connected to the stack between the base 3 and the burner 25. The pipe 47 may extend to the height required.

The upper side of the base 3 is provided with a hopper shaped depression 50, in the lower end of which is mounted a horizontal, rotary shaft 48, which extends through the base 3 and has mounted on it a feed screw 49, which extends through a horizontal discharge opening communicating with the depression 50.

The mixed fuel and air discharged from the burner 25 is ignited. The resulting flame will form a hot blast which will be projected upwardly in the stack toward the drum 10. A down current will be formed by the air pressure in the upper part of the stack, thus carrying downward to and out through the pipe 47, the gaseous products of combustion. When the stack has been sufficiently heated the cement forming materials, which may be powdered clay and lime stone, are placed in the hopper 6, from which they are carried, mixed with each other, and discharged from the conductor 5 into the stack upon the blades 11 of the rotating drum 10. The powdered cement forming materials in a raw and non-calcined state are thus diffused, and in falling toward the base 3 contact from the flame with the burner 25, which calcines and fuses or clinkers the diffused materials, after which they are precipitated in the form of small nodules or clinkers in the depression 50 of the base 3. The screw 49 carries these nodules or clinkers through the discharge opening in which is located the screw 49. The nodules or clinkers being small are in convenient form for handling and for grinding. As the powdered raw material is not subjected to any preliminary calcination prior to its diffusion in the stack, the particles will fall more slowly and will form smaller nodules than would be the case if any preliminary calcination were effected prior to their introduction into the stack.

By reason of the finely powdered cement forming materials being subjected to the upwardly moving blast from the burner 25, while the materials are diffused and suspended in the air or gaseous substances in the stack, the calcined and clinkered or fused materials cannot form into large chunks or clinkers which would be difficult to break up.

Furthermore, the calcination and chemical union between the materials being effected while the materials are in a diffused condition, are more complete than would be the case if the materials were not diffused during calcination.

Modifications of my invention, within the scope of the appended claims, may be made without departing from its spirit.

Having thus described my invention, what I claim and desire to secure by Letters Patent, is:—

1. The method of burning cement consisting in diffusing in a gaseous fluid in a vertical kiln, raw non-calcined mixed powdered cement-making materials, and heating the diffused materials sufficiently to fuse them while they are diffused, the materials being permitted to float slowly downwardly until clinkerized.

2. The method of burning cement consisting in diffusing in a gaseous fluid in a vertical kiln, raw non-calcined mixed powdered cement-making materials, and subjecting the diffused mixed materials to contact with a flame having heat sufficient to fuse them while they are diffused, the materials being permitted to float slowly downwardly until clinkerized.

3. The method of burning cement consisting in diffusing in a gaseous fluid in a vertical kiln, raw non-calcined mixed powdered cement forming materials and permitting the diffused mixed materials to fall, and heating said materials sufficiently to fuse them while falling, the materials being permitted to float slowly downwardly until clinkerized.

4. The method of burning cement consisting in diffusing in a gaseous fluid in a vertical kiln, raw non-calcined mixed powdered cement forming materials and permitting the diffused materials to fall, and projecting a flame upwardly through the falling materials, the flame having heat sufficient to fuse the materials while they are falling, the materials being permitted to float slowly downwardly until clinkerized.

5. In the manufacture of cement, the herein described method which consists in burning fuel within a vertical kiln, and introducing pulverized raw cement materials to the burning fuel, said materials being held in suspension and calcined by the burning fuel and permitted to float slowly downwardly until completely clinkered and the clinker thereafter descending to the bottom of the kiln.

6. In the manufacture of cement, the herein described method which consists in introducing fuel into a substantially vertically arranged kiln, burning the fuel within the kiln, and introducing pulverized raw cement materials into the kiln at a plane above the plane of introduction of the fuel, said materials being held in suspension and calcined by the burning fuel and permitted to float slowly downwardly until completely clinkerized and the clinker thereafter descending to the bottom of the kiln.

In testimony whereof I have signed my name to this specification in presence of two subscribing witnesses.

ALEXANDER CARNIE.

Witnesses:
 E. B. HOUSE,
 FLORENCE M. VENDIG.